(12) United States Patent
Emter

(10) Patent No.: US 6,319,104 B1
(45) Date of Patent: Nov. 20, 2001

(54) TOOL FOR RESURFACING MACHINE

(76) Inventor: James Emter, 23429 NE. 29th Ave., Ridgefield, WA (US) 98642

( * ) Notice: Subject to any disclaimer, the term of this patent is extended or adjusted under 35 U.S.C. 154(b) by 0 days.

(21) Appl. No.: 09/513,437

(22) Filed: Feb. 25, 2000

(51) Int. Cl.$^7$ ................................ B24B 7/00; B23C 9/00
(52) U.S. Cl. ................ 451/262; 451/496; 451/510; 451/512; 409/145; 409/203; 409/213
(58) Field of Search ........................... 144/116, 233, 144/237; 241/191, 192, 195, 197, 292.1; 409/138, 203, 204, 213, 217; 451/190, 194, 195, 261, 262, 415, 496, 497, 508, 510, 512

(56) References Cited

U.S. PATENT DOCUMENTS

| | | |
|---|---|---|
| 3,817,305 * | 6/1974 | Gibbs . |
| 3,981,337 * | 9/1976 | Sundstrom . |
| 4,009,742 * | 3/1977 | Ziegelmeyer . |
| 4,685,845 * | 8/1987 | Emter ................................ 409/145 |
| 4,969,605 * | 11/1990 | Morin ................................ 241/192 |
| 5,524,839 * | 6/1996 | Schade et al. ................... 241/101.2 |
| 5,904,306 * | 5/1999 | Elliott et al. ....................... 241/88.1 |
| 5,957,176 * | 9/1999 | Stein . |

* cited by examiner

*Primary Examiner*—Timothy V. Eley
(74) *Attorney, Agent, or Firm*—Chernoff, Vilhauer, McClung & Stenzel, LLP

(57) ABSTRACT

A tool for use in an abrading or resurfacing machine includes a head portion, a shank portion and a base portion, the shank portion joining the head and base portions and having a shape that tapers outwardly from a narrow neck where it joins the head portion to the base portion. The tool is inserted into a pocket in an abrading wheel having the same shape as the tool. Because of the irregular shape, centrifugal force will not cause the tool to become dislodged. The tapered neck serves to distribute torsional forces imparted by an adjustment screw which alleviates metal fatigue.

5 Claims, 2 Drawing Sheets

# US 6,319,104 B1

TOOL FOR RESURFACING MACHINE

BACKGROUND OF THE INVENTION

The following invention relates to a cutting head tool for use with resurfacing or abrading machines which is safe to use and easy to replace.

Conventional resurfacing machines of the type that resurface guide plugs used in the sawmill industry have a pair of opposed upper and lower turntables. The turntables each have a replaceable cutting tool which includes a diamond stylus or the like. A workpiece is fed into the space between the rotary turntables and is resurfaced by the scraping action of the cutting tools. An example of a machine of this type is shown in the Emter U.S. Pat. No. 4,685,845 entitled GUIDE PAD RESURFACING APPARATUS. In this patent each turntable includes a slot which receives a rectangular cutting tool containing a diamond stylus. The tool is held in the slot by a screw, and cutting depth is regulated by an adjustment screw bearing against the tool from the other side of each turntable. The adjustment screw torsions the tool slightly causing it to bend to achieve proper depth.

A problem with this arrangement is that the tool can slip out of the slot because of centrifugal force. In addition although the tool is a wear part, it wears out prematurely because of the bending caused by the torsion screw.

BRIEF SUMMARY OF THE INVENTION

The present invention over comes these problems by providing an abrading tool having a distinct shape that allows it to fit within a pocket in a turntable so that it will not slip out, even under centrifugal forces produced at high speeds. Further the configuration of the tool permits the use of less expensive turntable wheels that spin at higher speeds. The tool may further be adjusted by a torsion screw for cutting depth without causing the metal fatigue so problematic of prior art tools.

The invention provides a tool for use in a resurfacing machine, comprising upper and lower rotary turntables, the turntables including, on an inner surface of each, a cutout pocket having a shape and depth corresponding substantially to the shape and thickness of a cutting tool. The tool comprises a base portion, a shank portion and a head portion, the base portion having a first width, the shank portion being joined to the base portion at a neck and tapering inwardly in width along the shank portion and joining the head portion which is wider than the shank. The head portion has an abrading tip located at approximately an outer radial edge of each turntable.

The shape of the tool and its fit within the pocket assures that the tool will not slip out even at high speeds. The tapering shank distributes the torsion caused by the adjustment screw along the length of the tool so that it does not develop a premature bend.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
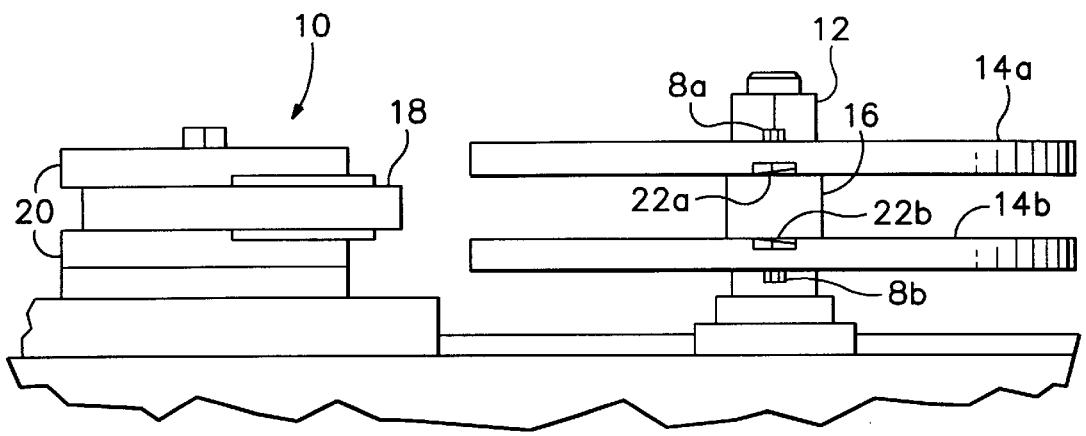
FIG. 1 is a partial side view of a resurfacing machine that employs the tool of the present invention.
Figure 2:
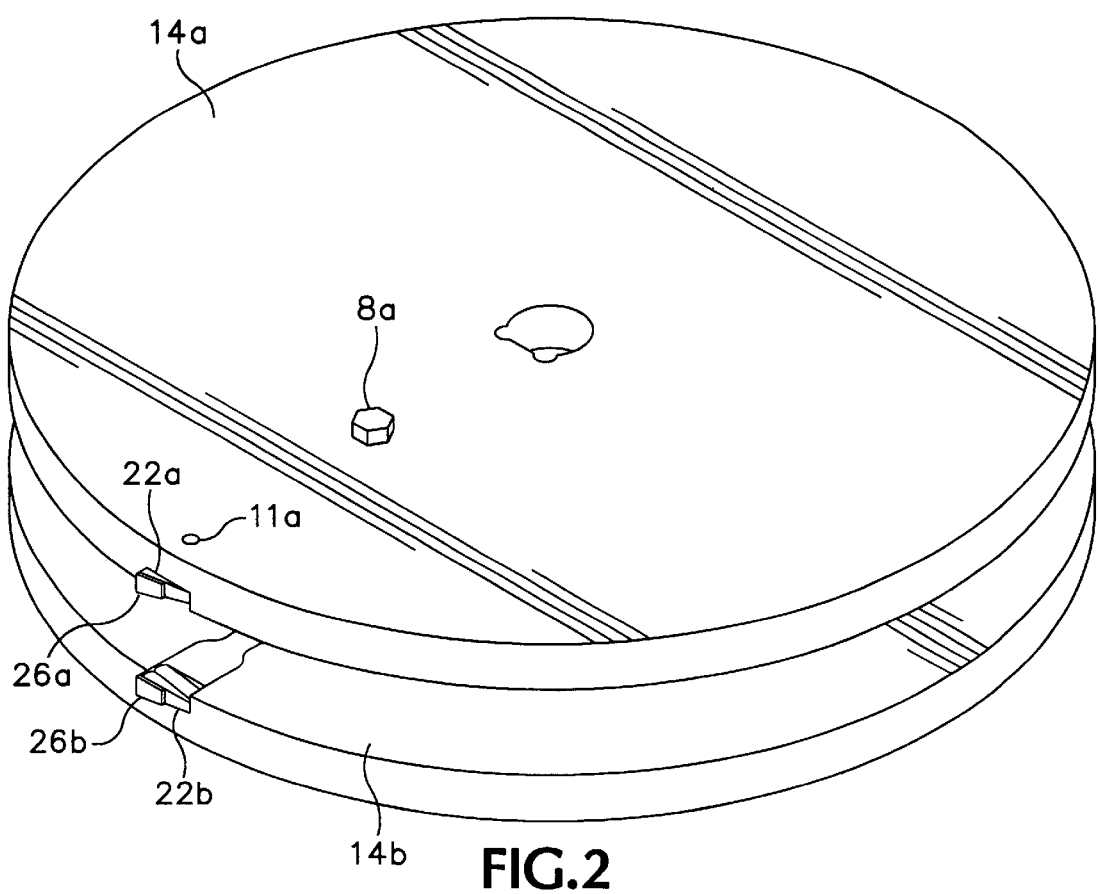
FIG. 2 is a perspective view of a pair of turntables used in the machine of FIG. 1.

Referring to FIG. 1, a resurfacing machine 10 includes a spindle 12 that supports two turntables 14a and 14b separated by a spacer 16. The operation of this machine is more fully described in U.S. Pat. No. 4,685,845, the disclosure of which is incorporated herein by reference. Briefly, a workpiece 18 is held by a clamp 20 which has a reciprocating motion to move the workpiece between the spinning turntables 14a and 14b. The turntables 14a and 14b include upper and lower cutting tools 22a and 22b. Each tool includes a diamond abrading tip 26a and 26b, respectively. Adjustment screws 11a and 11b threaded through the turntables 14a and 14b bear against the head portion of the tool flexing it and causing the stylus to protrude into the space between the two turntables.

Figure 3A:
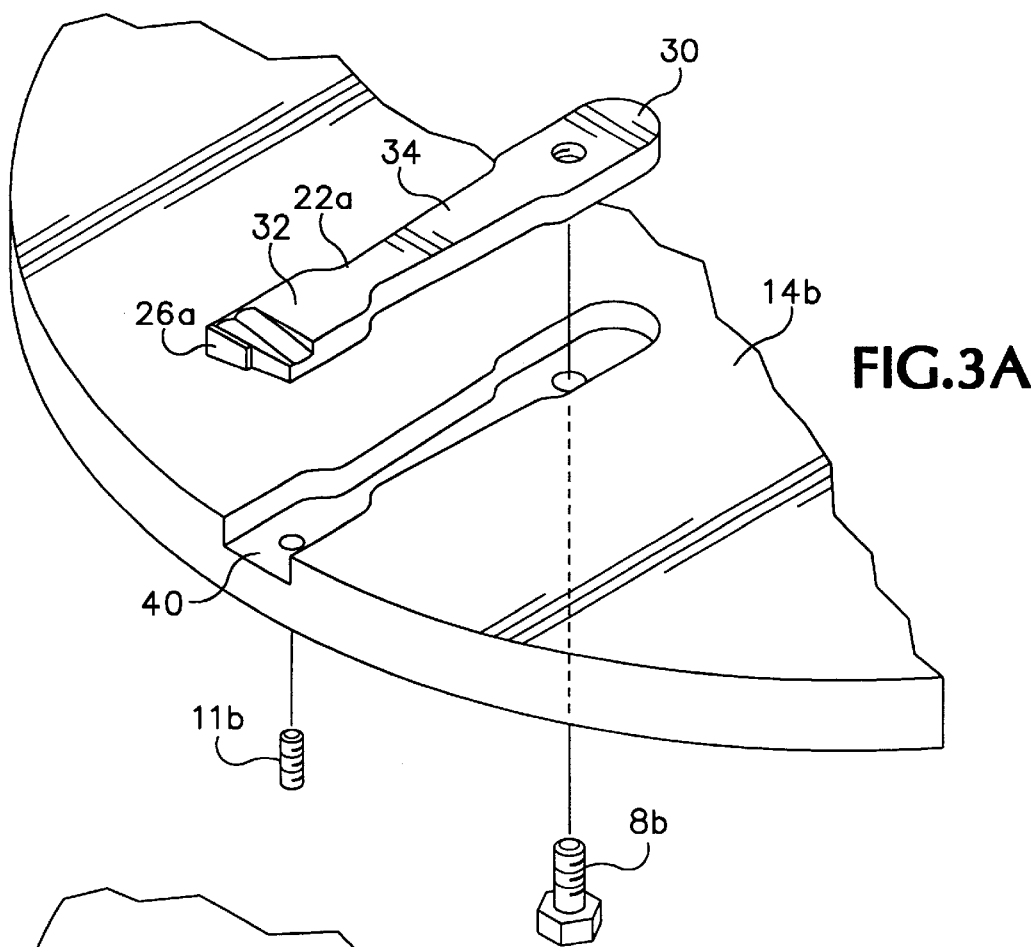
FIG. 3A is an exploded partial perspective view of a turntable and the tool of the invention ready for mounting therein.
Figure 3B:
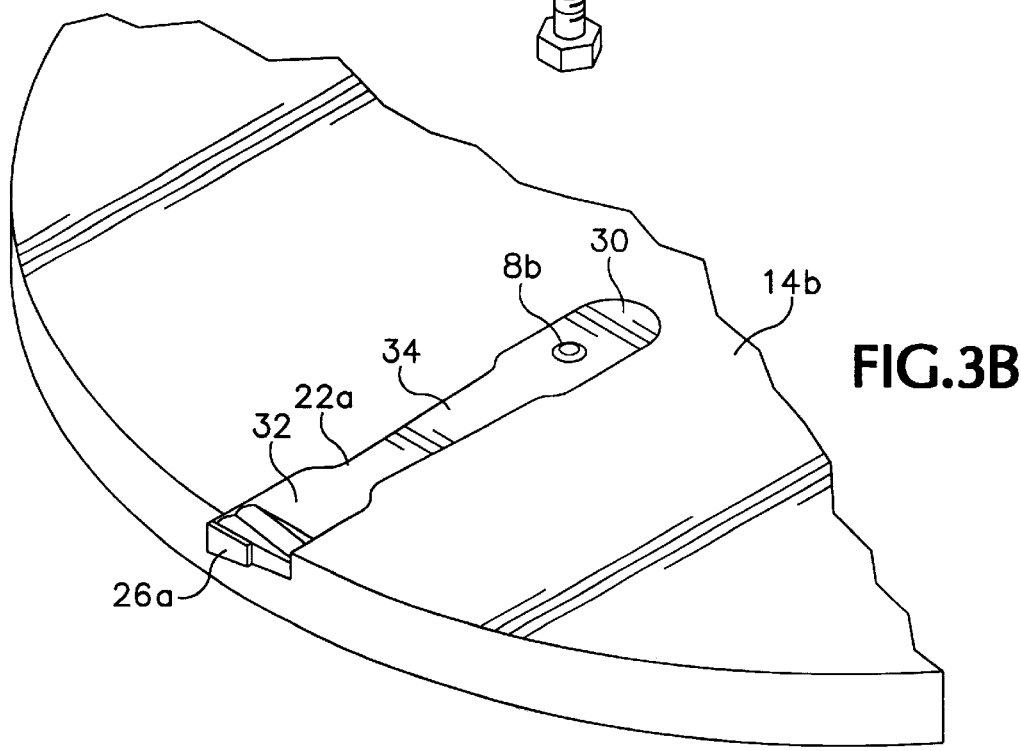
FIG. 3B is a turntable with the tool mounted and ready for use.

The tools 22a and 22b are held in place by bolts such as bolts 8a and 8b. Referring to FIGS. 3A and 3B, the tool 22a has a base portion 30 connected to a head portion 32 by a shank portion 34. The shank portion 34 is narrower in width than either the base portion 30 or the head portion 32. For ease of manufacture the head and base portions may be the same width although this is not required. The base portion includes a threaded aperture to receive the bolt 86. The tool 22a fits into a pocket 40, formed in the inner surface of the turntable plate 14a, and having the same shape and dimension as the tool 22a.

The shank portion 34 is tapered inwardly along its length from the base portion to the head portion. This taper provides a shape such that the tool 22a cannot slide out of the pocket 40. This permits the use of very high speed wheels as turntables 14a and 14b. The turntables may then be made of aluminum which is less expensive than the material typically used in this application which is steel.

The taper of the shank portion 34 also serves to distribute the torsional force caused by the adjustment screw along the length of the shank portion so that the tool experiences stress evenly along the length of the tool. This distribution of force contributes to extending the useful life of the tool and alleviates the premature failure of the tool from metal fatigue.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In combination
   (a) a resurfacing machine comprising at least one rotary turntable, said turntable including an inner surface having a hollow tool insert region of a predetermined shape, and
   (b) a selectively removeable cutting tool having substantially said predetermined shape and adapted to fit within said hollow tool insert, said tool comprising a base portion, a shank portion and a head portion, the base portion having a first width, the shank portion having a width narrower than the base portion and joined thereto at a shoulder, and a head portion joined to the shank portion, the head portion having an abrading tip located approximately at an outer radial edge of said turntable.

2. The combination of claim 1 including a pair of rotary turntables, each turntable including said hollow tool insert and said selectively removeable cutting tool, said tools being mutually aligned as upper and lower cutting tools.

3. The combination of claim 2 wherein said shank portions of said cutting tools are tapered inwardly from said base portions toward said head portions.

4. The combination of claim 3 wherein said head portions of said cutting tools have widths that exceed the widths of said shank portions.

5. The combination of claim 4 including a fastener member selectively fastening said tools within said hollow tool inserts at said base portions thereof, and depth adjustment screws journalled in said turntables and bearing against said head portions of said cutting tools so as to selectively cause bending moments in each of said cutting tools to thereby regulate the cutting depth of each said tool.

* * * * *